(12) United States Patent
Carteau

(10) Patent No.: US 6,330,642 B1
(45) Date of Patent: Dec. 11, 2001

(54) THREE INTERCONNECTED RAID DISK CONTROLLER DATA PROCESSING SYSTEM ARCHITECTURE

(75) Inventor: Daniel Carteau, Phoenix, AZ (US)

(73) Assignee: Bull HN Informatin Systems Inc., Billerica, MA (US)

( * ) Notice: Subject to any disclaimer, the term of this patent is extended or adjusted under 35 U.S.C. 154(b) by 8 days.

(21) Appl. No.: 09/607,028

(22) Filed: Jun. 29, 2000

(51) Int. Cl.[7] .................................................. G06F 12/00
(52) U.S. Cl. ............................................. 711/114; 711/119
(58) Field of Search ................................... 711/114, 119, 711/161, 162

(56) References Cited

U.S. PATENT DOCUMENTS

| | | | |
|---|---|---|---|
| 5,325,488 | * | 6/1994 | Carteau et al. ................. 395/275 |
| 5,548,711 | * | 8/1996 | Brant et al. ................. 395/182.03 |
| 5,617,530 | * | 4/1997 | Stallmo et al. ............... 395/182.04 |
| 5,761,705 | * | 6/1998 | DeKoning et al. ................. 711/113 |
| 5,911,779 | * | 6/1999 | Stallmo et al. ..................... 714/6 |

\* cited by examiner

*Primary Examiner*—Matthew Kim
*Assistant Examiner*—Stephen Elmore
(74) *Attorney, Agent, or Firm*—J. S. Solokian; B. E. Hayden; J. H. Phillips

(57) ABSTRACT

A data processing system with a RAID cache disk subsystem utilizes three RAID cache disk controllers to provide increased performance along with increased reliability, especially in the event of a failure of one of the disk controllers. Disk writes are mirrored in two disk controllers in order to guarantee integrity in the event of a disk controller or interface failure. Typically this write caching must be terminated when one of the controllers fails in order to maintain integrity. In the present invention, write caching continues utilizing the two remaining disk controllers.

20 Claims, 4 Drawing Sheets

THREE INTERCONNECTED RAID DISK CONTROLLER DATA PROCESSING SYSTEM ARCHITECTURE

FIELD OF THE INVENTION

The present invention generally relates to data processing systems, and more specifically to RAID cache disk controller systems.

BACKGROUND OF THE INVENTION

This invention is in the Storage for Computer's domain and addresses especially High Performances and very High Availability (HA) RAID disk sub-systems. There are already on the market some High Availability disk-subsystems. One problem is, with the arrival of the new information technologies like Internet Web servers, e-commerce, Storage Area Networks (SANs), etc. the requests on High performances and specially High Availability features will dramatically increase including requests about a high level of performances even after failure has occurred.

If we exclude from the discussion high range RAID disk subsystems based on old mainframe technologies with a poor level of High Availability, the majority of the HA RAID sub-systems are based on a 2 RAID disk controller configuration. These two controllers are in the "active - active" mode (both are operational together and contribute for the overall performance of the sub-system). The High Availability features are supported by the use of redundant components such as:

Redundant power supplies,

Redundant power cords,

Redundant cooling,

Redundant controllers,

Redundant connections,

RAID redundancy at disks level,

For performances point of view, each RAID controller has to support the I/Os that it receives from its attached host(s). To increase performance, RAID disk controllers have a data cache used for Read and Write operations.

For Read operations, Read-ahead features or specific cache algorithms in certain applications increase the performances of the RAID disk subsystem by reducing access time to the data when the data sought is found in the data cache instead of requiring a disk access.

In Write operations, write cache is used to mask the physical operation of writing on the disk drives. The Write operation can be very load and time consuming. In RAID-5, for example, one Write operation generates two Read and two Write operations on two different disk drives. This explains write cache is an important feature to use in order to provide reasonable response times to the host(s). When the data to be written are in a disk controller's write cache, the disk controller can send a message to the host indicating that the operation is completed. It is then the responsibility of the disk subsystem to guarantee that the data is written successfully to the disks.

Because High Availability is linked with a very high level of data integrity, it is important to protect the contents of the write cache against a failure of the cache, the disk controller, or a power outage. This problem can be solved by mirroring the write cache content of each disk controller in the other one. In this case, the termination message to the host is sent only when the data to be written is in the two write caches. In case of a disk controller or a cache failure, the second disk controller achieves the write operation on the disk drives.

For data exchange between the two disk controllers, the drive interfaces, or a specific link between the two disk controllers are used. With these features, when a disk controller fails (or the path to access to this controller), the access to the data is insured by the second disk controller. For a performance point of view, the situation is not as good:

The complete load has to be supported by one controller instead of 2 (100% increase), The write cache could not be used without data integrity risks because it cannot be mirrored, so the performances in write operations are hugely degraded.

These performances issues will be seen as unacceptable by more and more disk controller users using their storage subsystems in non-stop activities like e-commerce, web servers, etc. where a significant degradation of performance can have a very negative impact on their business.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

A data processing system with a RAID cache disk subsystem utilizes three RAID cache disk controllers to provide increased performance along with increased reliability, especially in the event of a failure of one of the disk controllers. Disk writes are mirrored in two disk controllers in order to guarantee integrity in the event of a disk controller or interface failure. Typically this write caching must be terminated when one of the controllers fails in order to maintain integrity. In the present invention, write caching continues utilizing the two remaining disk controllers.

In the following description, numerous specific details are set forth to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details have been omitted in as much as such details are not necessary to obtain a complete understanding of the present invention and are within the skills of persons of ordinary skill in the relevant art.

The terms "bus" and "channel" will be used to refer to a plurality of signals or conductors which may be used to transfer one or more various types of information, such as data, addresses, control, or status. Either busses or channels can utilize either serial or parallel technologies.

Figure 1:
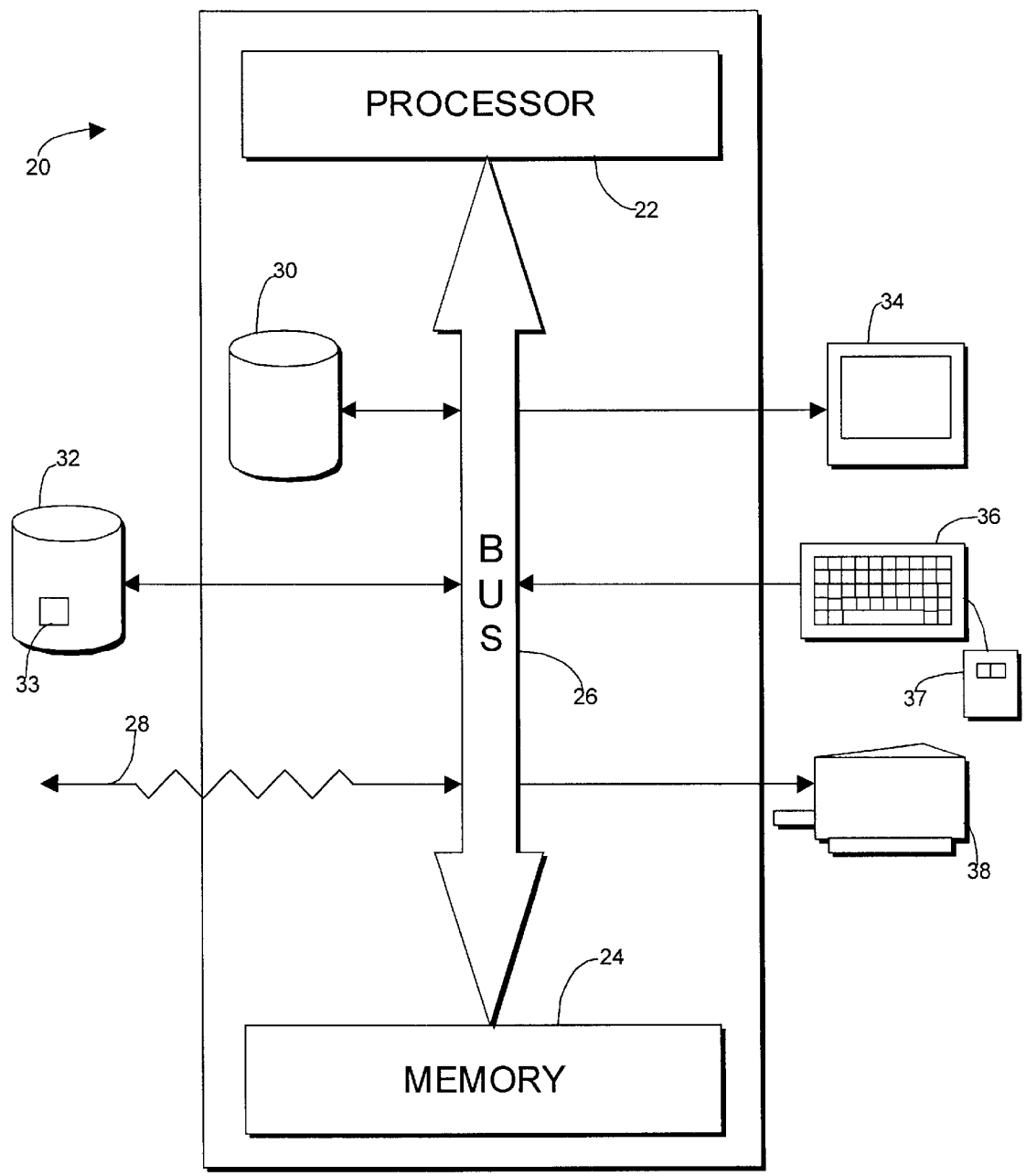
FIG. 1 is a block diagram illustrating a General Purpose Computer in a data processing system.

FIG. 1 is a block diagram illustrating a General Purpose Computer 20 in a data processing system. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, and EEPROM. Also connected to the Bus are Secondary Storage 30, External Storage 32, output devices such as a monitor 34, input devices such as a keyboard 36 (with mouse 37), and printers 38. Secondary Storage 30 includes machine-readable media such as hard disk drives (or DASD). External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such as data base management software, operating systems, and user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Figure 2:
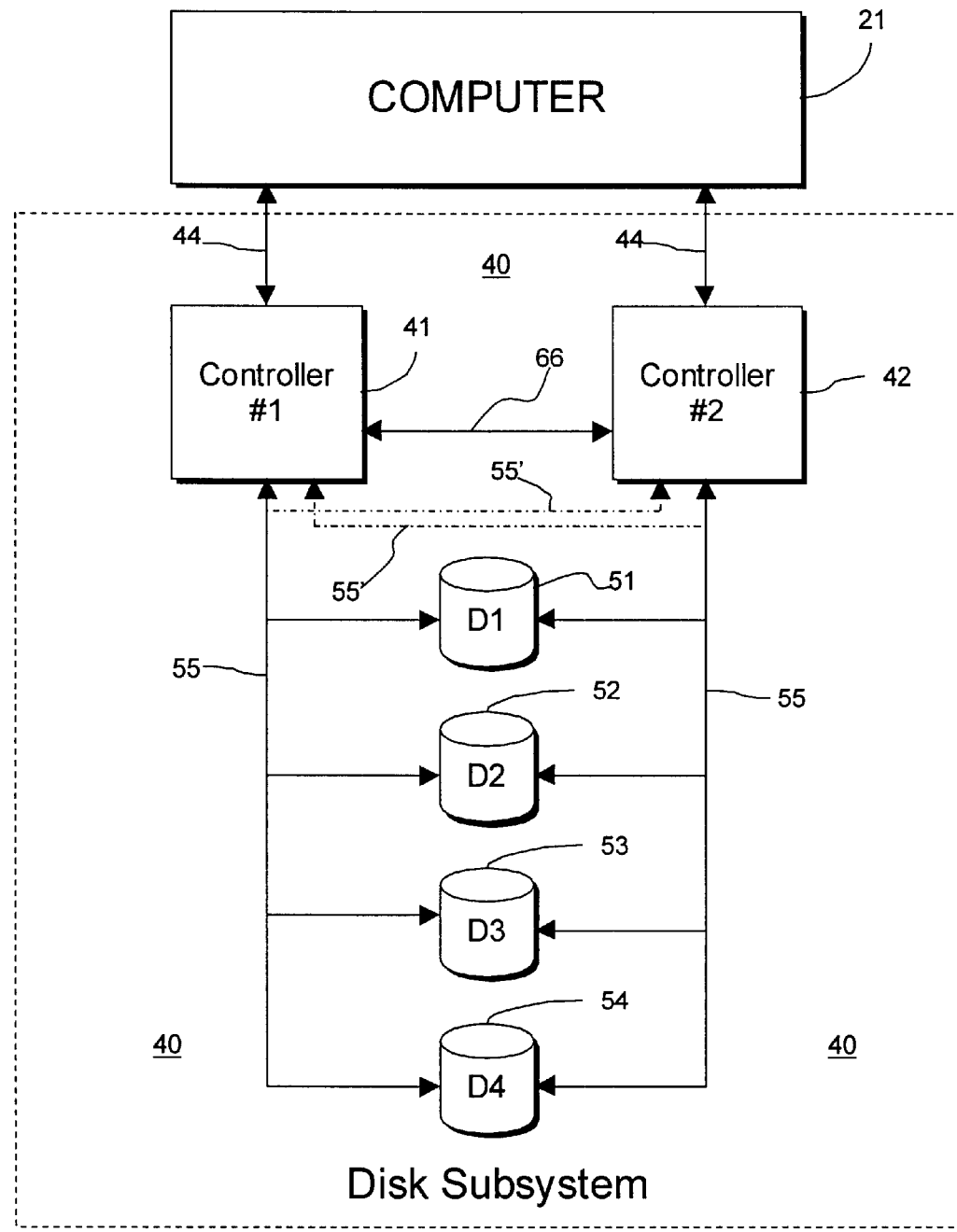
FIG. 2 is a block diagram illustrating a data processing system having a computer and a disk subsystem with two RAID disk controllers to communicate with and control four disk drives.

FIG. 2 is a block diagram illustrating a data processing system 20 having a computer 21 and a disk subsystem 40 with two RAID disk controllers 41, 42 to communicate with and control four disk drives 51, 52, 53, 54. The disk subsystem 40 comprises two RAID disk controllers 41, 42 coupled to four disk drives 51, 52, 53, 54. The computer 21 is connected 44 to each of the two RAID disk controllers 41, 42. Each of the two RAID disk controllers 41, 42 is connected to 55 and controls each of the four disk drives 51, 52, 53, 54. The two RAID disk controllers 41, 42 are also coupled together 66. This is illustrative of a sample high availability disk subsystem.

In the preferred embodiment, the connection between the computer 21 and RAID disk controller 41, 42, comprises one or more channels. Two common types of channels 44 in use today are SCSI and Fiber Channel. Other types of computer systems, interconnections, and channels are within the scope of this invention. Note that in a typical case, the computer 21 will typically be multiply connected 44 to each of the two RAID disk controllers 41, 42. Note also that large scale data processing systems will typically include more than one disk subsystem and more than four disks. Additionally, each such RAID disk controller 41, 42 will often communicate with and control more than the four disk drives 51, 52, 53, 54 shown. Two common types of connections in use today are SCSI and Fiber Channel. However, other types of connections are also within the scope of this invention.

Figure 3:
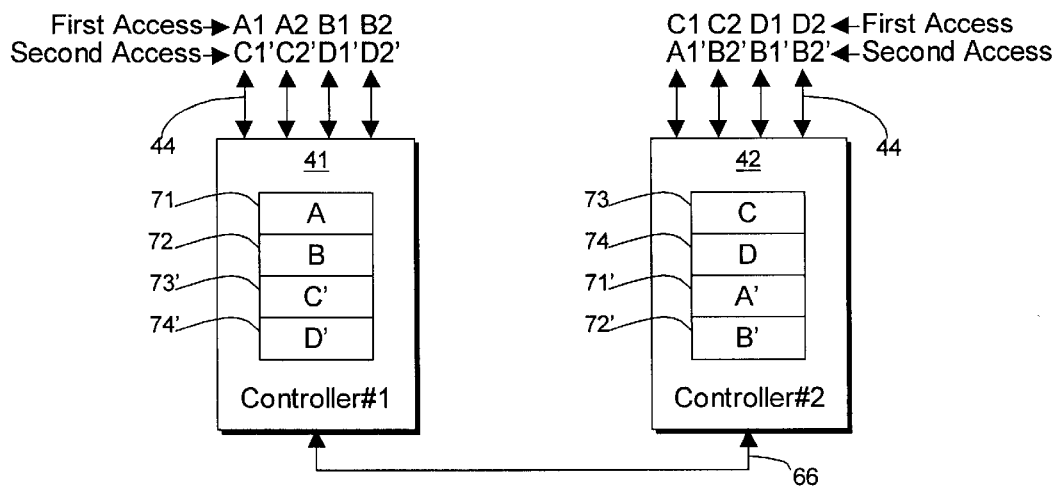
FIG. 3 is a block diagram further illustrating the write cache management of two RAID disk controller system shown in FIG. 2.

FIG. 3 is a block diagram further illustrating the write cache management of two RAID disk controller 41, 42 system shown in FIG. 2. Typically, the cache memory in RAID disk controllers 41, 42, is divided between read cache memory and write cache memory. This division can be static or dynamic. In RAID disk controllers 41, 42, reads from a portion of a disk 51, 52, 53, 54 controlled by the RAID disk controllers 41, 42 immediately returning the contents of cache memory if that read cache memory contains data corresponding to that portion of the disk selected by the read request. In the case of disk writes, two alternatives are possible. First, the disk controller 41, 42 can do a "write through" where the disk controller does not indicate a completion of the write to the host computer 21 until it has been successfully written to disk 51, 52, 53, 54. This can take some time, and thus this results in reduced performance, especially in RAID 5 configurations. A second alternative is to immediately acknowledge the completion of the write to the host computer 21, and then write the data to the disk in the background 51, 52, 53, 54.

One problem with this later solution is that if the RAID disk controller 41, 42 containing the data to be written out to disk 51, 52, 53, 54 crashes between the time that it acknowledged the completion of the write to the computer 21, but before it had a chance to write the data to disk 51, 52, 53, 54, then the contents of the disk 51, 52, 53, 54 will be incorrect. This is not a problem in all situations, but can be a major problem when the disk 51, 52, 53, 54 contains a database.

One solution to this is to utilize half of the write cache memory in the RAID disk controllers 41, 42 to hold cached data from the RAID disk controller's primary disks 51, 52, 53, 54. The remainder of the write cache memory in the RAID disk controller mirrors the contents the half of write cache memory dedicated to the primary disks of a second RAID disk controller. When a write is performed to a RAID disk controller, the write does not indicate completion to the host computer 21 until the data being written is present in the cache memory of two RAID disk controllers 41, 42. The result of this is that if one of the RAID disk controllers dies 41, 42, no data is lost, and all of the disks 51, 52, 53, 54 can be accurately written. Either the two disk controllers 41, 42 will preferably communicate over direct connections 66, or alternatively an internal bus, or through drive interfaces 55' (shown as dashed lines). Typically, the data to be mirrored will be sent by the host computer to one disk controller 41 over a channel connection 44, which will send it to the other disk controller 42 over the intra-controller connection 55 to be mirrored.

In this FIG., the write caches of two RAID disk controllers 41, 42 are shown, each with room for four zones of data, each of which typically corresponds with some number of units of data records on the attached disks 51, 52, 53, 54. The first disk controller 41 has data block "A" 71 and "B" 72 that correspond to data on its primary disk drives in its write cache. Similarly, the second disk controller has data blocks "C" 73 and "D" 74 corresponding to data on its primary disk drives in its write cache. The first disk controller also has data blocks C' 73' and D' 74' mirroring those data blocks C 73 and D 74 on the second controller in its write cache. Similarly, the second disk controller 42 also has data blocks A' 71' and B' 72' mirroring those data blocks A 71 and B 72 on the first controller 42 in its write cache.

The remainder of the description of this FIG. concerns channel configurations. This is illustrative only. Other configurations are within the scope of this invention. In this FIG., each of the two RAID disk controllers 41, 42 is shown having four host channels 44. The first controller has two channels dedicated to a first group of disks (A), and two channels dedicated to a second group of disks (B). Similarly, the second controller has two channels dedicated to a first group of disks (C) attached to it, and two channels dedicated to a second group of disks (D) attached to it. The first set of channels for the first disk controller can also be utilized to communicate with the first set of disks (C) for the second disk controller when the second controller has crashed.

Similarly, the second set of channels for the first disk controller can also be utilized to communicate with the second set of disks (D) for the second disk controller. Similarly, the channels connected to the second controller can be utilized to communicate with the disks (A and B) for the first controller when that first controller has crashed.

Figure 4:
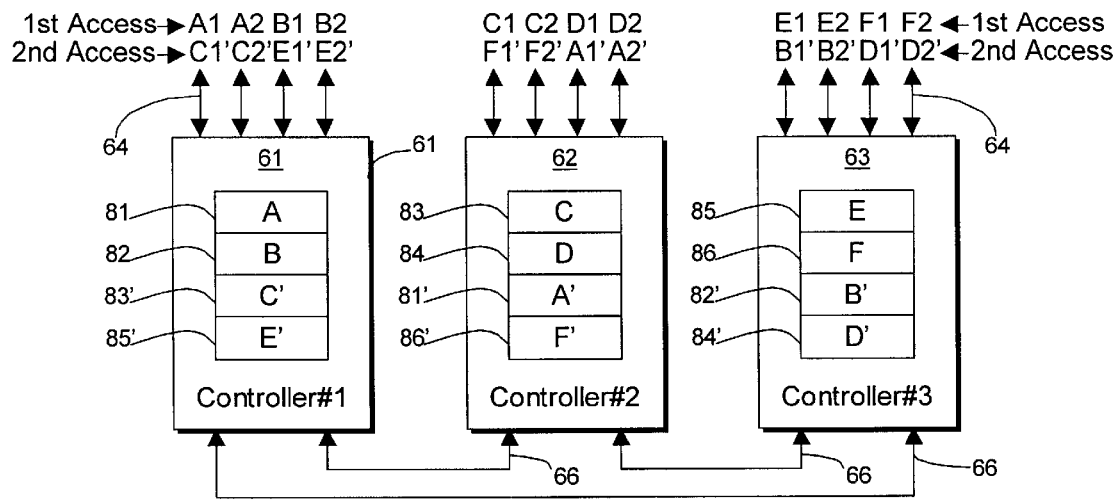
FIG. 4 is a block diagram illustrating the write cache management of three RAID disk controllers in a disk subsystem, in accordance with a preferred embodiment of the preferred invention.

FIG. 4 is a block diagram illustrating the write cache management of three RAID disk controllers 61, 62, 63 in a disk subsystem 40, in accordance with a preferred embodiment of the preferred invention.

FIG. 4 is similar to FIG. 3, except that three RAID disk controllers 61, 62, 63, are coupled together instead of the two 41, 42 in FIG. 3 in order to provide write cache backup of each other. One difference is that in each RAID disk controller, 61, 62, 63, half of the write cache memory is dedicated to the RAID disk controller's primary disk drives, and a quarter of the write cache memory is dedicated to the primary disk drives of each of the other two RAID disk controllers.

In this FIG., the first RAID disk controller 61 dedicates half of its write cache memory to its two primary groups of disk drives (A 81 and B 82). The second RAID disk controller 62 dedicates half of its write cache memory to its two primary groups of disk drives (C 83 and D 84). The third RAID disk controller 63 dedicates half of its write cache memory to its two primary groups of disk drives (E 85 and F 86). One quarter of the write cache memory of the first RAID disk controller (C' 83') is dedicated to mirroring the first group of disks (C 83) for the second controller 62, and its last quarter of the write cache memory (E' 85') is dedicated to mirroring the first group of disks (E 85) for the third controller 63. Similarly, one quarter of the write cache memory (A' 81') of the second RAID disk controller 62 is dedicated to mirroring the first group of disks (A 81) for the first controller 61, and the last quarter of its write cache memory (F' 86') is dedicated to mirroring the second group of disks (F 86) for the third controller 63. Similarly, one quarter of the write cache memory (B' 82') of the third RAID disk controller 63 is dedicated to mirroring the second group of disks (B 82) for the first controller 61, and the last quarter of its write cache memory (D' 84') is dedicated to mirroring the second group of disks (D 84) for the second controller 62.

The configuration shown in FIG. 4 has a number of advantages over the configuration shown in FIG. 3. First, it provides increased performance. Secondly, if usage of one of the three RAID disk controllers 61, 62, 63 is lost for some reason, the system can revert to the configuration shown in FIG. 3. This continues to allow full caching of writes, and allows write commands to continue to be acknowledged to the host computer 21 once data to be written is present in two different RAID disk controllers 41, 42. Contrast this with the configuration in FIG. 3, where when usage of one of its two RAID disk controllers 41, 42 is lost, then the remaining RAID disk controller must write through to disk 51, 52, 53, 54 before acknowledging completion of the write to the host computer 21.

As in FIG. 3, in the preferred embodiment, the three RAID disk controllers 61, 62, 63 preferably communicate utilize direct intracontroller connections 66, necessitating two connections per controller 61, 62, 63 in order to communicate with the each of the other two controllers. Alternatively, the RAID disk controllers can be coupled to each other over a bus. However, with current technology, this configuration tends to reduce the level of High Availability. One reason that the RAID disk controllers 61, 62, 63 communicate with each other is to mirror write data. Another reason is in order to notify each other that they have mirrored another RAID disk controller's write cache data. This allows the primary RAID disk controller 61, 62, 63 for a given disk drive to acknowledge to the host computer 21 a disk write without the necessity of waiting for the write to that disk to actually complete.

The remainder of the description of this FIG. concerns channel configurations. This is illustrative only. Other configurations are within the scope of this invention. Each RAID disk controller 61, 62, 63 is shown with four host channels 64. The first two host channels 64 connected to the first controller 61 provide primary access (A1, A2) to the first set of disks (A 81) controlled by that controller 61 and secondary access (C1', C2') to the first set of disks controlled by the second controller 62. The other two host channels 64 connected to the first controller 61 provide primary access (B1, B2) to the second set of disks (B 82) primarily controlled by that controller 61 and secondary access (E1', E2') to the first set of disks (E 85) primarily controlled by the third RAID disk controller 63.

The first two host channels 64 connected to the second controller 62 provide primary access (C1, C2) to the first set of disks (C 83) controlled by that controller 62 and secondary access (F1', F2') to the second set of disks (F 86) controlled by the third controller 63. The other two host channels 64 connected to the second controller 62 provide primary access (D1, D2) to the second set of disks (D 84) primarily controlled by that controller 62 and secondary access (A1', A2') to the first set of disks (A 81) primarily controlled by the first RAID disk controller 61.

The first two host channels 64 connected to the third controller 63 provide primary access (E1, E2) to the first set of disks (E 85) controlled by that controller 63 and secondary access (B1', B2') to the second set of disks (B 82) controlled by the first controller 61. The other two host channels 64 connected to the third controller 63 provide primary access (F1, F2) to the second set of disks (F 86) primarily controlled by that controller 63 and secondary access (D1', D2') to the second set of disks (D 84) primarily controlled by the second RAID disk controller 62.

Figure 5:
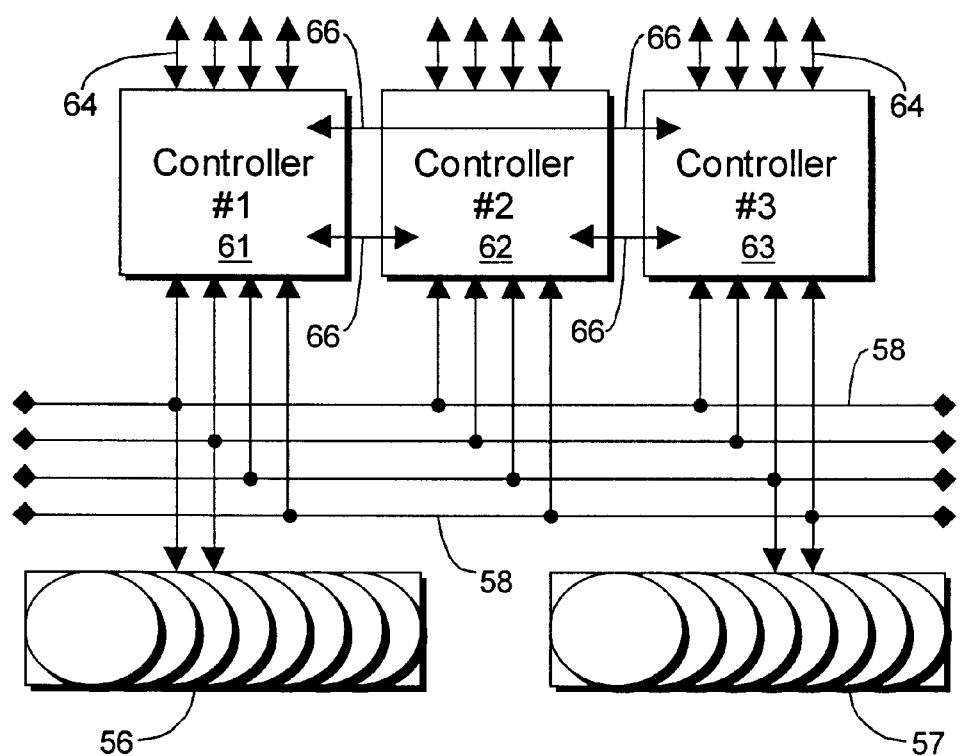
FIG. 5 is a block diagram further illustrating the disk subsystem shown in FIG. 4.

FIG. 5 is a block diagram further illustrating the disk subsystem 40 shown in FIG. 4. The three RAID disk controllers 61, 62, 63 are shown, each with four host connections 64. In the preferred embodiment, the three RAID disk controllers 61, 62, 63 are each directly connected 66 to the other two RAID disk controllers 61, 62, 63. Alternately, the RAID disk controllers 61, 62, 63 can be coupled together on a bus. The three RAID disk controllers 61, 62, 63 are each connected 58 to two sets of disk drives 56, 57. Each controller 61, 62, 63 has two connections to each of the two sets of disk drives 56, 57. This allows each of the RAID disk controllers 61, 62, 63 to provide access to any disk drive.

One of the advantages of this three RAID disk controller 61, 62, 63 architecture is increased performance due to half again as many disk controllers. Another advantage is better High Availability numbers since the disk subsystem 40 can operate after two RAID disk controller 61, 62, 63 have failed. A third advantage is the possibility of better load distribution and load leveling. Another advantage is that in the case of a RAID disk controller failure, there is only a 50% load increase per controller, versus the 100% increase for a two RAID disk controller 41, 42 architecture. Also, after such a controller failure, the write cache remains enabled on the remaining controllers, allowing write completion host notification before the data is actually written to disk.

Those skilled in the art will recognize that modifications and variations can be made without departing from the spirit of the invention. Therefore, it is intended that this invention encompasses all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A disk subsystem for use in a data processing system wherein the disk subsystem comprises:
    a first disk controller comprising:
        a first disk controller write cache; and
        a first means for coupling the first disk controller to a first host computer;
    a second disk controller bidirectionally coupled to the first disk controller and comprising:
        a second disk controller write cache,
        a first means for coupling the second disk controller to the first host computer;
    a third disk controller comprising:
        a third disk controller write cache,
        a first means for coupling the third disk controller to the first host computer;
    a set of disk drives logically comprising:
        a first set of logical disk drives and a third set of logical disk drives bidirectionally coupled to the first disk controller and the second disk controller;
        a fourth set of logical disk drives and a sixth set of logical disk drives bidirectionally coupled to the second disk controller and the third disk controller; and
        a second set of logical disk drives and a fifth set of logical disk drives bidirectionally coupled to the third disk controller and the first disk controller; and
    means for bidirectionally coupling the first disk controller to the second disk controller, the second disk controller to the third disk controller, and the third disk controller to the first disk controller;
    wherein:
        when in a first state which requires that the first disk controller, the second disk controller, and the third disk controller be active and able to communicate with the first host computer:
            the first disk controller provides write access to, write caching of, and delayed writing to the first set of logical disk drives and the second set of logical disk drives and provides write cache mirroring of the third set of logical disk drives and the fifth set of logical disk drives;
            the second disk controller provides write access to, write caching of, and delayed writing to the third set of logical disk drives and the fourth set of logical disk drives and provides write cache mirroring of the first set of logical disk drives and the sixth set of logical disk drives; and
            the third disk controller provides write access to, write caching of, and delayed writing to the fifth set of logical disk drives and the sixth set of logical disk drives and provides write cache mirroring of the second set of logical disk drives and the fourth set of logical disk drives.

2. The disk subsystem in claim 1 wherein:
the first means for coupling the first disk controller to the first host computer is a channel connection.

3. The disk subsystem in claim 2 wherein:
the channel connection is a serial interface.

4. The disk subsystem in claim 2 wherein:
the channel connection is a SCSI interface.

5. The disk subsystem in claim 1 wherein:
the first means for coupling the first disk controller to the first host computer includes a storage area network (SAN).

6. The disk subsystem in claim 1 wherein:
the means for bidirectionally coupling the first disk controller to the second disk controller, the second disk controller to the third disk controller, and the third disk controller to the first disk controller comprises:
    a direct connection between the first disk controller and the second disk controller;
    a direct connection between the second disk controller and the third disk controller; and
    a direct connection between the third disk controller and the first disk controller.

7. The disk subsystem in claim 1 wherein:
the first set of logical disk drives and the third set of logical disk drives bidirectionally coupled to the first disk controller and the second disk controller with a SCSI channel; and
the means for bidirectionally coupling the first disk controller to the second disk controller comprises: a SCSI connection between the second disk controller and the first disk controller.

8. The disk subsystem in claim 1 wherein:
the first disk controller further comprises:
    a first means for coupling the first disk controller to a second host computer.

9. The disk subsystem in claim 1 wherein:
the first disk controller further comprises:
    a second means for coupling the first disk controller to the first host computer.

10. The disk subsystem in claim 9 wherein:
the first disk controller further comprises:
    a first means for coupling the first disk controller to a second host computer; and
    a second means for coupling the first disk controller to the second host computer.

11. The disk subsystem in claim 1 wherein:
when in a second state which requires that the first disk controller and the second disk controller be active and able to communicate with the first host computer and the third disk controller be unable to communicate with the first host computer:
    the first disk controller provides write access to, write caching of, and delayed writing to the first set of logical disk drives and provides write cache mirroring of the third set of logical disk drives;
    the second disk controller provides write access to, write caching of, and delayed writing to the third set of logical disk drives and provides write cache mirroring of the first set of logical disk drives and the sixth set of logical disk drives;
    the first disk controller provides write access to the second set of logical disk drives and the fifth set of logical disk drives; and
    the first second controller provides write access to the fourth set of logical disk drives and the sixth set of logical disk drives.

12. The disk subsystem in claim 11 wherein:

when in a third state which requires that the first disk controller be active and able to communicate with the first host computer and the third disk controller and the second disk controller be unable to communicate with the first host computer:
 the first disk controller provides write access to the first set of logical disk drives, the second set of logical disk drives, the third set of logical disk drives, and the fifth set of logical disk drives.

13. The disk subsystem in claim 11 wherein:

the fourth set of logical disk drives and the sixth set of logical disk drives are bidirectionally coupled to the first disk controller;

the second set of logical disk drives and the fifth set of logical disk drives are bidirectionally coupled to the second disk controller; and when in the second state:
 the first disk controller provides write access to, write caching of, and delayed writing to the second set of logical disk drives and the fifth set of logical disk drives and provides write cache mirroring of the fourth set of logical disk drives and the sixth set of logical disk drives; and
 the second disk controller provides write access to, write caching of, and delayed writing to the fourth set of logical disk drives and the sixth set of logical disk drives and provides write cache mirroring of the second set of logical disk drives and the fifth set of logical disk drives.

14. The disk subsystem in claim 13 wherein:

when in a third state which requires that the first disk controller be active and able to communicate with the first host computer and the third disk controller and the second disk controller be unable to communicate with the first host computer:
 the first disk controller provides write access to the first set of logical disk drives, the second set of logical disk drives, the third set of logical disk drives, the fourth set of logical disk drives, the fifth set of logical disk drives, and the sixth set of logical disk drives.

15. The disk subsystem in claim 1 wherein:

the first disk controller is a RAID cache disk controller.

16. The disk subsystem in claim 15 wherein:

the first disk controller further comprises:
 a first disk controller read cache; and
 the first disk controller write cache and the first disk controller read cache together form a first disk controller cache memory.

17. The disk subsystem in claim 16 wherein:

a size of the first disk controller cache memory allocated to the first disk controller write cache is dynamic.

18. The disk subsystem in claim 16 wherein:

a size of the first disk controller cache memory allocated to the first disk controller write cache is static.

19. The disk subsystem in claim 1 wherein:

when in the first state:
 the first disk controller further provides write cache mirroring of the fourth set of logical disk drives and the sixth set of logical disk drives;
 the second disk controller further provides write cache mirroring of the second set of logical disk drives and the fifth set of logical disk drives; and
 the third disk controller further provides write cache mirroring of the first set of logical disk drives and the third set of logical disk drives.

20. A data processing system comprising:

a first host computer;

a first disk controller comprising:
 a first disk controller write cache; and
 a first means for coupling the first disk controller to the first host computer;

a second disk controller bidirectionally coupled to the first disk controller and comprising:
 a second disk controller write cache,
 a first means for coupling the second disk controller to the first host computer;

a third disk controller comprising:
 a third disk controller write cache,
 a first means for coupling the third disk controller to the first host computer;

a set of disk drives logically comprising:
 a first set of logical disk drives and a third set of logical disk drives bidirectionally coupled to the first disk controller and the second disk controller;
 a fourth set of logical disk drives and a sixth set of logical disk drives bidirectionally coupled to the second disk controller and the third disk controller; and
 a second set of logical disk drives and a fifth set of logical disk drives bidirectionally coupled to the third disk controller and the first disk controller; and means for bidirectionally coupling the first disk controller to the second disk controller, the second disk controller to the third disk controller, and the third disk controller to the first disk controller;

wherein:
 when in a first state which requires that the first disk controller, the second disk controller, and the third disk controller be active and able to communicate with the first host computer:
  the first disk controller provides write access to, write caching of, and delayed writing to the first set of logical disk drives and the second set of logical disk drives and provides write cache mirroring of the third set of logical disk drives and the fifth set of logical disk drives;
  the second disk controller provides write access to, write caching of, and delayed writing to the third set of logical disk drives and the fourth set of logical disk drives and provides write cache mirroring of the first set of logical disk drives and the sixth set of logical disk drives; and
  the third disk controller provides write access to, write caching of, and delayed writing to the fifth set of logical disk drives and the sixth set of logical disk drives and provides write cache mirroring of the second set of logical disk drives and the fourth set of logical disk drives.

* * * * *